C. ODEN & J. A. SCHMITT.
TEAT CUP CLAW.
APPLICATION FILED JUNE 12, 1917. RENEWED OCT. 21, 1918.
1,285,338. Patented Nov. 19, 1918.
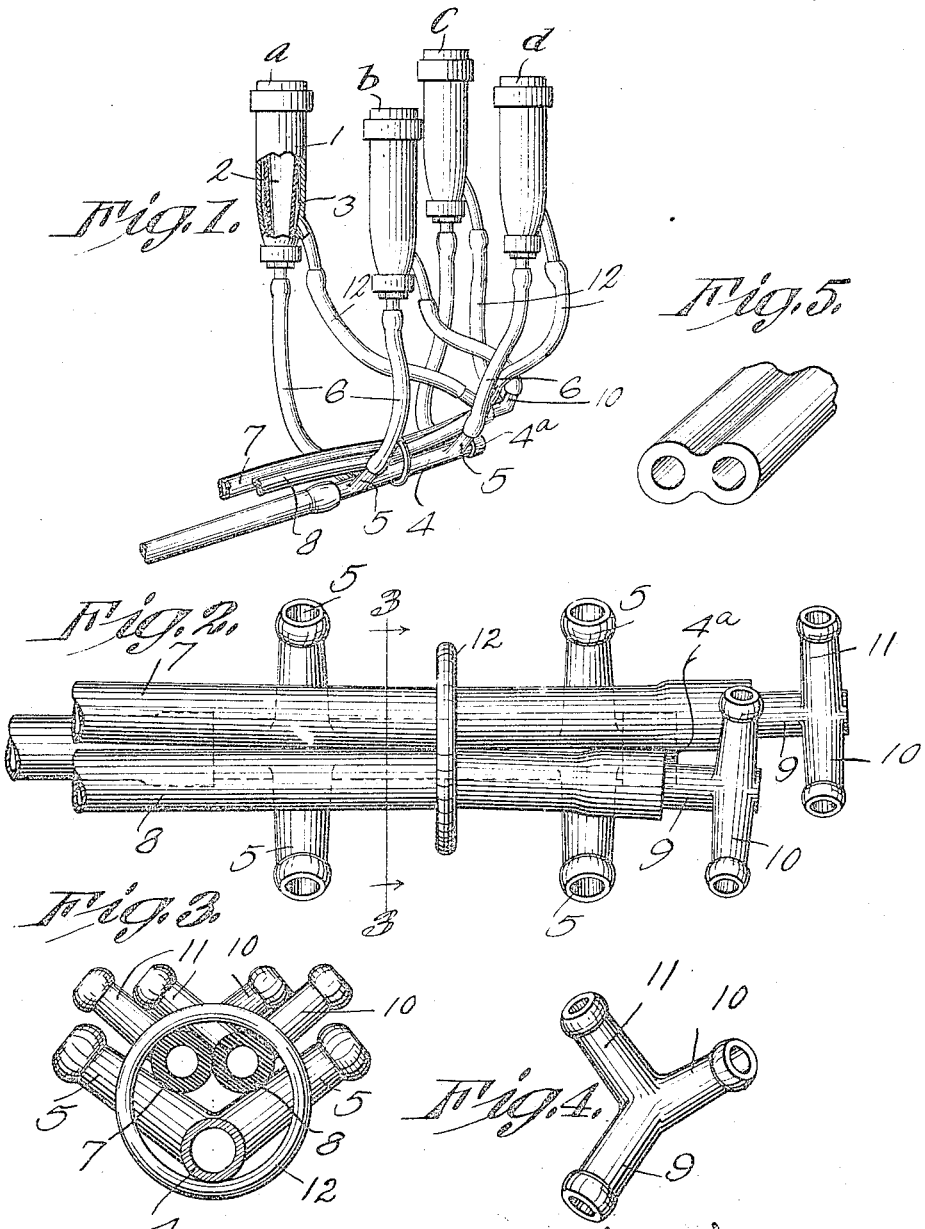

UNITED STATES PATENT OFFICE.

CLYDE ODEN AND JOHN A. SCHMITT, OF COLUMBUS, OHIO, ASSIGNORS TO THE UNIVERSAL MILKING MACHINE COMPANY, A CORPORATION OF OHIO.

TEAT-CUP CLAW.

1,285,338.

Specification of Letters Patent. Patented Nov. 19, 1918.

Application filed June 12, 1917, Serial No. 174,178. Renewed October 21, 1918. Serial No. 259,143.

*To all whom it may concern:*

Be it known that we, CLYDE ODEN and JOHN A. SCHMITT, citizens of the United States, residing at Columbus, in the county of Franklin and State of Ohio, have invented certain new and useful Improvements in Teat-Cup Claws, of which the following is a specification.

Our invention relates to milking apparatus and more particularly the ramified connections for the teat cups known generally as the "cluster" or "claw."

The object of the invention is to provide a cluster or claw which not only will be cheapened in construction, but will be more efficient in use, positive in operation and unlikely to get out of repair.

A further object of the invention is to provide a flexible yielding member, the component parts of which may be independently adjusted to suit the convenience of the operator and the condition of use.

A further object of the invention is to provide an improved form of "cluster" claw adapted to so connect the teat cups with the suction apparatus as to more nearly imitate hand milking operation, and to produce a substantially uninterrupted flow of milk.

With the above primary and other incidental objects in view as will more fully appear in the specification, the invention consists of the features of construction, the parts and combinations thereof, or their equivalents, as hereinafter described and set forth in the claims.

Referring to the drawings Figure 1 is a perspective view of a group of teat cups connected one with the other, and with the suction apparatus by the cluster or claw forming the subject matter hereof. Fig. 2 is a top plan view of the cluster or claw disconnected from the teat cups. Fig. 3 is a transverse sectional view on line 3—3 of Fig. 2. Fig. 4 is a detail perspective view of one of the Y or terminal connections disconnected from the conduit. Fig. 5 is a detail perspective view of a modified form of the flexible hose connection.

Like parts are indicated by similar characters of reference throughout the several views.

The cluster or claw construction forming the subject matter hereof is particularly adapted for use in conjunction with a suction pulsator of the double acting or alternating type such as is shown in copending application Serial No. 107,457. Its use however is not limited to that particular style of alternating pulsator but may be used in conjunction with any suction means adapted to alternately exhaust the air conduits and teat cups connected therewith, as hereinafter described. The suction means or pulsator, *per se*, forms no part of the present invention.

The claw or cluster is further adapted for use in conjunction with teat cups of the pneumatic pulsating or vibratory type embodying in addition to the main suction chamber an auxiliary chamber to and from which the air is alternately admitted and exhausted, thereby causing a vibratory action of the walls of the inner or suction chamber. While for purposes of illustration a teat cup has been shown in detail in the drawing, such teat cup, *per se*, forms no part of the present invention, but as at present advised will form the subject matter of a separate application.

Referring to the drawings, *a*, *b*, *c* and *d* are the teat cups comprising a single group which may be of any suitable construction of the pulsating or vibratory type. Such teat cups usually comprise a shell or housing 1, preferably of metal, within which is a flexible tubular suction chamber 2, preferably of rubber, rubberized fabric, or other flexible composition. This suction chamber 2 is so proportioned and located within the housing or shell 1 as to form an annular air chamber 3 intermediate the flexible walls of the suction chamber 2 and the walls of the housing 1. The suction chamber 2 is maintained under constant suction draft or partial vacuum. Air is alternately admitted to and exhausted from the chamber 3. The admission of air to the chamber 3 compresses or collapses the flexible walls of the suction chamber 2 which, as before stated, is maintained under partial vacuum. The exhaustion of the chamber 3 whereby the air pressure within the chamber 2 and the chamber 3 will equalize permits the flexible walls of the chamber 2 to expand or return to normal. The device forming the subject matter hereof is not limited to the particular style of teat cup shown in the drawings but may be used with any construction of pulsating cup.

To this end the cluster or claw forming the subject matter hereof comprises a main or milk conduit 4 from which project laterally angularly disposed branch conduits 5—5—5 each of which is connected by a flexible conduit 6 with the suction chamber 2 of the corresponding teat cups, $a$, $b$, $c$ and $d$. It will thus be seen that the main or milk conduit is common to all the teat cups, each of which is in direct communication therewith. The main milk conduit 4 is preferably formed from rigid material such as metal, composition, hard rubber, "bakelite" or some other similar product. In order that the milk tube or conduit 4 may be readily cleansed, it is provided at its extreme end with a movable cap $4^a$, which enables a cleaning device to be passed entirely through the tube or conduit when disconnected from the hose through which the milk is conveyed to the receptacle. Extending parallel with the milk conduit 4, are a plurality of flexible independent air conduits. In the present instance but two of these flexible air conduits 7 and 8 have been shown. It will be obvious that if so desired one may be provided for each teat cup whereby the teat cups may be independently operated in succession. In the embodiment shown in the drawing each air conduit 7 and 8 comprises a length of rubber, fabric or other flexible hose; at its extreme end each conduit is provided with a substantially Y-shaped connection comprising three integral or connected nipples 9, 10 and 11, projecting in such relation from a common or central connecting point that each nipple or connection extends laterally in relation with the other two nipples. In other words the several branches or nipples are not located in a single common plane, but one nipple or connection projects substantially perpendicular to the plane in which the remaining two nipples are located. One of the nipples is introduced into the extreme end of each flexible independent conduit 7 and 8, while the remaining angularly disposed nipples or connections are connected with branch conduits 12 which communicate with the air or pulsation chambers of a pair of teat cups. By this arrangement each independent flexible conduit 7 and 8 communicates with a single pair of teat cups independent of the remaining pair of cups. The cups may be connected with air conduits 7 and 8 either in parallel relation or diagonally, viz., the two right hand and two left hand cups may be connected to separate independent flexible conduits or the two rear or the two forward cups may be connected to separate conduits, or in lieu of this arrangement the diagonally disposed cups may be connected with the same conduit. The latter arrangement is to be preferred. The conduits 7 and 8 are so connected to the pulsator or control device, that the particular teat cups communicating with the respective conduits will be alternately operated.

The milk conduit 4 and air or actuating media conduits 7 and 8 are yieldingly held in grouped relation one with the other whereby each of said conduits may be adjusted longitudinally in relation with the other, by means of an encircling ring or band 12. This ring is preferably of metal but may be of any suitable or convenient material. It may be either rigid or flexible. The several conduits cannot escape from this retaining ring or encircling band 12 inasmuch as the branch conduits 5, 10, and 11 project radially beyond the limit of the ring or band. These branch conduits therefore, comprise limiting stops. Thus while the several conduits are held in grouped relation they may be independently adjusted longitudinally as is found most convenient.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described our invention, what we claim is:—

1. In a teat cup claw, the combination with a plurality of teat cups, of a milk conduit common to all the cups, a plurality of conduits for actuating media, said conduits being respectively connected to different teat cups, and a flexible connection between the actuating media conduits and the milk conduit.

2. In a teat cup claw for milking apparatus, the combination with a plurality of teat cups, of a rigid milk conduit common to all the teat cups, and a plurality of flexible actuating media conduits connected to said milk conduit.

3. In a teat cup claw for milking apparatus, the combination with a plurality of teat cups, of a milk conduit and a plurality of conduits for actuating media, said milk conduit and actuating media conduits being independently adjustable in relation one with the other, and connecting means limiting the relative adjustment of said conduits.

4. In a teat cup claw for milking apparatus, the combination with a plurality of teat cups, of a milk conduit and actuating media conduits connected with said cups and a retaining member encircling all of said conduits, the conduits being independently adjustable within the limits imposed by said retaining member.

5. In a teat cup claw for milking apparatus, the combination with the plurality of teat cups, of a milk conduit common to all the cups, an actuating media conduit capable of independent adjustment in relation with the milk conduit, means for retaining said actuating media and milk conduits in grouped relation, and lateral projections upon said conduits limiting their independent adjustment.

6. In a teat cup claw for milking apparatus, the combination with a plurality of teat cups of independent milk and actuating conduits communicating with said cups, and a retaining ring encircling said conduits but independent thereof whereby said conduits are capable of independent adjustment in relation one with the other.

7. In a teat cup claw for milking apparatus, the combination with a plurality of teat cups, of independent milk and actuating media conduits communicating with said cups, and retaining means for confining said conduits in grouped formation but permitting limited independent adjustment thereof.

In testimony whereof, we have hereunto set our hands this 7th day of June, 1917.

CLYDE ODEN.
JOHN A. SCHMITT.

Witnesses:
H. J. OSSING,
GEORG VOTT.